(12) United States Patent
Montalban

(10) Patent No.: US 11,209,669 B2
(45) Date of Patent: Dec. 28, 2021

(54) NOSEPIECE FOR EYEGLASS FRAMES

(71) Applicant: VISOTTICA INDUSTRIE S.p.A., Susegana (IT)

(72) Inventor: Rinaldo Montalban, Venice (IT)

(73) Assignee: VISOTTICA INDUSTRIE S.P.A., Susegana (IT)

( * ) Notice: Subject to any disclaimer, the term of this patent is extended or adjusted under 35 U.S.C. 154(b) by 222 days.

(21) Appl. No.: 16/431,760

(22) Filed: Jun. 5, 2019

(65) Prior Publication Data
US 2019/0377195 A1 Dec. 12, 2019

(30) Foreign Application Priority Data
Jun. 8, 2018 (IT) .................. 102018000006165

(51) Int. Cl.
*G02C 5/12* (2006.01)
(52) U.S. Cl.
CPC .................. *G02C 5/122* (2013.01)
(58) Field of Classification Search
CPC .......... G02C 5/122; G02C 5/12; G02C 5/126; G02C 5/124; G02C 2200/18; G02C 2200/08; G02C 5/20; G02C 2200/04; G02C 3/003; G02C 1/06; G02C 1/10; G02C 2200/16; G02C 5/008; G02C 5/04; G02C 5/2263; G02C 11/08; G02C 1/08; G02C 2200/06; G02C 5/006; G02C 5/143; G02B 2027/0158; G02B 2027/0178; G02B 27/0172; G02B 27/0176; G02B 27/0179; G02B 30/00; G02B 2027/0138; G02B 2027/0154; G02B 2027/0159; G02B 27/0149; G02B 27/108; G02B 27/142; G02B 27/145; G02B 27/4205; G02B 6/00
See application file for complete search history.

(56) References Cited

U.S. PATENT DOCUMENTS 2,274,589 A   5/1941   Conneely
4,681,411 A   7/1987   Taddei
(Continued)

FOREIGN PATENT DOCUMENTS

DE   1212314 B   3/1966
DE   8615489 U1  5/1990
(Continued)

OTHER PUBLICATIONS

FR 2620832 A1 English machine translation 1989.*

*Primary Examiner* — William R Alexander
*Assistant Examiner* — Sharrief I Broome
(74) *Attorney, Agent, or Firm* — Mark M. Friedman

(57) ABSTRACT

Nosepiece for eyeglass frames, which comprises a plate, to which an appendage is fixed that is provided with a first through hole, and a cup which is provided with two second through holes and houses at its interior the appendage with the first through hole aligned with the second through holes. The nosepiece also comprises a screw having the stem inserted in the first through hole of the appendage and screwingly engaged in one of the second through holes of the cup. The screw is provided with an annular groove made on the stem, and the appendage comprises at least one retention tooth projecting into the first through hole and housed within the annular groove of the screw for the retaining of the latter.

10 Claims, 8 Drawing Sheets

(56) References Cited

U.S. PATENT DOCUMENTS

| | | | | |
|---|---|---|---|---|
| 5,872,612 A | * | 2/1999 | MacIntosh, Jr. | G02C 5/12 351/138 |
| 6,793,337 B1 | * | 9/2004 | Lin | G02C 5/12 351/136 |
| 7,559,646 B2 | | 7/2009 | Kwan | |
| 2002/0126254 A1 | * | 9/2002 | Kroman | G02C 5/12 351/136 |

FOREIGN PATENT DOCUMENTS

| | | | |
|---|---|---|---|
| EP | 0171461 B1 | 2/1986 | |
| EP | 1469337 A1 | 10/2004 | |
| EP | 2947504 A1 | 11/2015 | |
| FR | 2620831 A1 | 3/1989 | |
| FR | 2620832 A1 * | 3/1989 | G02C 5/12 |
| FR | 2620832 A1 | 3/1989 | |
| GB | 2013360 B | 8/1979 | |
| IT | 1423815 | 5/2014 | |
| WO | 2010057883 A1 | 5/2010 | |

* cited by examiner

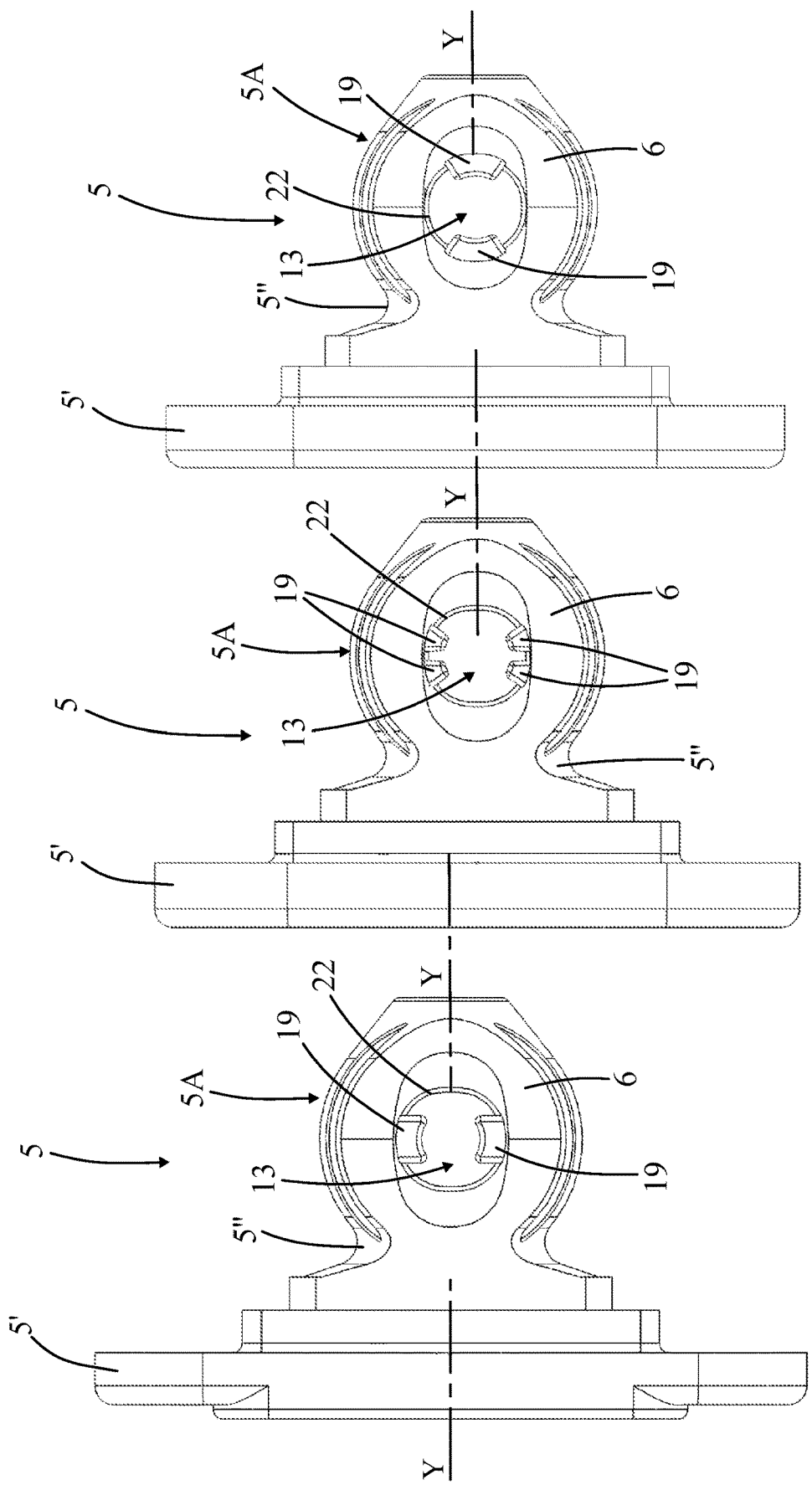

NOSEPIECE FOR EYEGLASS FRAMES

FIELD OF APPLICATION

The present invention regards a nosepiece for eyeglass frames.

The present nosepiece is advantageously intended to be employed in the production of frames for eyeglasses and in particular of metal frames, in order to determine, together with a second nosepiece of a provided pair of nosepieces, a correct ergonomic position of support of the frames on the nose of the user and hence for correctly centering the lenses with respect to the eyes, ensuring optimal vision.

Therefore, the nosepiece, subject of the present invention, is inserted in the eyeglasses industrial field, i.e. in the field of production and assembly of eyeglasses and of accessories and components for eyeglasses.

STATE OF THE ART

Conventionally, in the eyeglass field, the nosepieces are integrated in the frame in order to easily support the eyeglasses on the nose of the user.

In accordance with one of the embodiments that is most widespread on the market, each nosepiece consists of a plate, provided with a front face, intended to abut against the nose of a user, and with a rear face from which an appendage is projectingly extended, adapted to be connected by means of mechanical check means to a first end of a support arm, in turn fixed at its second end to the front of an eyeglass frame.

Usually the plate is made of soft plastic material (such as PVC or silicone) at whose interior an insert of harder material is partially embedded (usually such harder material is also made of plastic material, e.g. polycarbonate, or of metal, e.g. a zinc alloy), which forms the projecting appendage intended to be joined with the support arm fixed to the frame.

Generally, the mechanical check means of the nosepieces of known type comprise a hollow element fixed to the first end of the support arm, which houses the free end of the appendage of the plate in a retention relationship.

The latter is retained in the hollow element due to check means obtained with retention portions projecting from the hollow element, or, more often, by check means constituted by a screw which is inserted in a transverse hole of the hollow element and is engaged with the appendage of the plate.

The nosepieces with screw check means of conventional type have the advantage of making a simple, strong type of connection, which allows an easy and quick substitution of the plate in case of need or wear, since such check means are easily found on the market.

However, such nosepieces with screw check means have in practice shown that they do not entirely lack drawbacks.

The main drawback of the nosepieces of known type provided with screw check means lies in the fact that there is a high risk that the screw of the check means themselves exit outward, following the normal stresses to which the frame is subjected.

Indeed, such screw of the check means, screwingly inserted in the transverse hole of the hollow element, tends to be slowly unscrewed up to making the plate lose rigidity with respect to the frame, leading to an undesired movement on the nose of the user, e.g. due to the weight of the frame itself, negatively affecting the comfort of the latter once put on.

Such drawback can even lead (in the most extreme example) to the total exit of the screw from the transverse hole, completely disconnecting the nosepiece from the frame.

A further drawback of the nosepieces of known type lies in the fact that they have a poor adjustment of the position of the plates for an optimal adaptation to the shape of the nose.

Indeed, as is known, one of the requirements necessary for the frame to be comfortable for the user is that it correctly fits on the face and that therefore, among the other things, the nosepieces must have a good adjustable mobility in order to be adapted to the various shapes of the user's nose.

This mobility substantially depends on the connection between the plate and the support arm, conventionally ensured by the check means. Usually the screw check means have the drawback of equipping the frame on which they are mounted with poor mobility, and the aforesaid opposite drawback of having the plate that is moved in an undesired manner on the support arm of the frame of the eyeglasses, even being moved from when worn under the weight of the same frame.

In order to remedy this drawback of the nosepieces of known type provided with screw check means, the Applicant owns the patent IT 1423815, which describes a nosepiece for eyeglass frames provided with screw check means, in which the appendage of the plate is provided with a through hole traversed by the stem of the screw of the check means, in which the internal wall which delimits such through hole is tapered starting from the external faces of the hollow element towards the interior of the hole, up to a substantially median narrowing thereof, forming two frustoconical surfaces that are mirrored with respect to the aforesaid narrowing.

In this manner, so as to improve the movement of the plate with respect to the hollow element fixed to the frame, the stem of the screw placed to traverse the through hole of the appendage of the plate is free to be moved on the frustoconical surfaces which define such hole, allowing a substantially stereoscopic movement of the plate of the nosepiece.

However, also the nosepiece briefly described up to now in practice is not entirely free of the abovementioned drawback, which lies in the fact that the screw tends to be unscrewed, loosening the connection of the plate with the frame.

In order to at least partially overcome the drawbacks of the screw check means, nosepieces with means for checking the plates of ball/socket type were obtained, which increase the possibility of adaptation of the nosepiece to the shape of the nose of the user.

Examples of nosepieces of this type are described in the patents listed hereinbelow: U.S. Pat. Nos. 4,681,411; 2,274,589; 7,559,646; GB 2013360; WO 2010057883; DE 8815489U and EP 171461.

The nosepieces of known type described in these patents have proven not entirely lacking drawbacks, given that the check means of ball/socket type employed up to now do not allow a simple and quick assembly and disassembly of the plate.

Therefore, the check means of ball/socket type have only improved the possibility for adjustment of the plates with respect to the check means of screw type, but they have negatively affected the substitution of the worn plates with other new plates.

In addition, such check means of ball/socket are much more expensive and difficult to find on the market with respect to the screw check means.

Generally the check means of ball/socket type comprise a ball and a corresponding spherical seat joined together by means of shape coupling obtained with elastic or plastic deformation of one of the two components (usually the semispherical seat).

Consequently, given the reduced size of these components, the check means of ball/socket type (which in some of the known above-indicated nosepiece solutions are made of plastic material) have a very high risk of breakage. The same components also form extremely "personalized" check means, in the sense that if it is necessary to substitute the plate with another new one, they are not interchangeable with plates of conventional screw type, which are easily found on the market.

Another drawback of the nosepieces employing check means of ball/socket type of known type lies in the lack, in most cases, of means for limiting the rotation of the plate or, even in the case of presence of the latter (as in the case of the nosepiece described in the patent U.S. Pat. No. 4,681,411), they are in any case unsuitable and not very strong.

PRESENTATION OF THE INVENTION

In this situation, the problem underlying the present invention is to eliminate the drawbacks of the abovementioned prior art by providing a nosepiece for eyeglass frames that ensures an optimal stability of the plate of the nosepiece with respect to the frame itself.

A further object of the present finding is to provide a nosepiece for eyeglass frames that has high mechanical strength and offers a high plate retention assurance.

A further object of the present finding is to provide a nosepiece for eyeglass frames which allows a quick and easy substitution of the support plate on the nose with a new one, whether this is the same or of standardized type with retention elements that can easily be found on the market.

A further object of the present finding is to provide a nosepiece for eyeglass frames which can be easily manufactured in automatic production processes for eyeglasses.

A further object of the present finding is to provide a nosepiece for eyeglass frames which is simple and inexpensive to manufacture.

A further object of the present finding is to provide a nosepiece for eyeglass frames which allows adjusting the position of the plate with tilt angles greater than those of the nosepieces with screw check elements.

BRIEF DESCRIPTION OF THE DRAWINGS

The technical characteristics of the finding, according to the aforesaid objects, are clearly seen in the contents of the below-reported claims and the advantages thereof will be more evident from the following detailed description, made with reference to the enclosed drawings, which represent several merely exemplifying and non-limiting embodiments of the invention, in which:

FIG. 12 shows an enlarged detail of the nosepiece according to the invention in a lateral axonometric view, relative to the insert fixed to the plate in a first embodiment thereof;

FIG. 13 shows an enlarged detail of the nosepiece according to the invention in a lateral axonometric view, relative to the insert fixed to the plate in a second embodiment thereof;

FIG. 14 shows an enlarged detail of the nosepiece according to the invention in a lateral axonometric view, relative to the insert fixed to the plate in a third embodiment thereof;

DETAILED DESCRIPTION OF A PREFERRED EMBODIMENT

Figure 1:
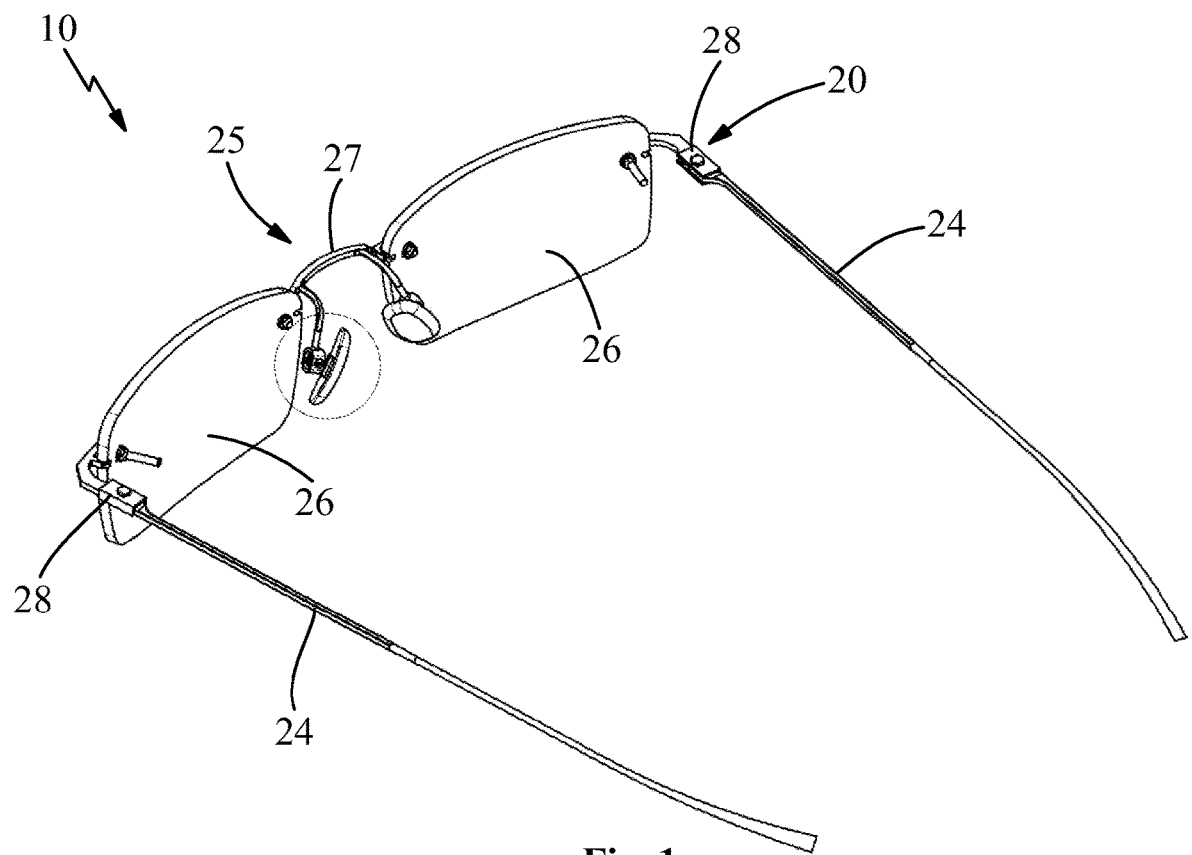
FIG. 1 shows a frame for eyeglasses with nosepieces according to the present invention mounted thereon, in which one of the nosepieces is shown within a circumference.
Figure 2:
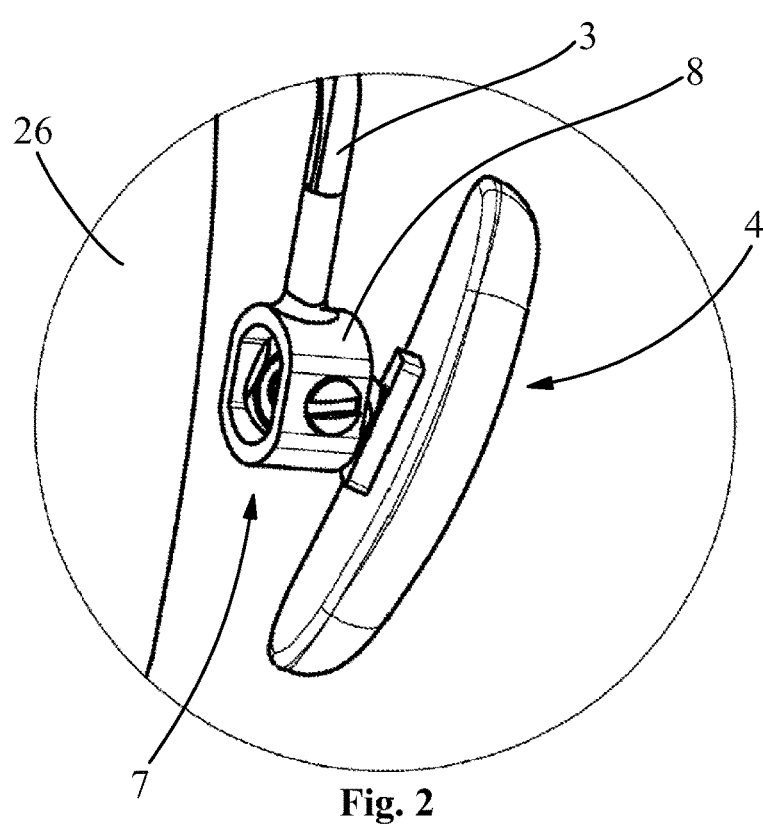
FIG. 2 shows an enlarged detail of the frame for eyeglasses of FIG. 1 relative to one of the two nosepieces according to the present invention.
Figure 3:
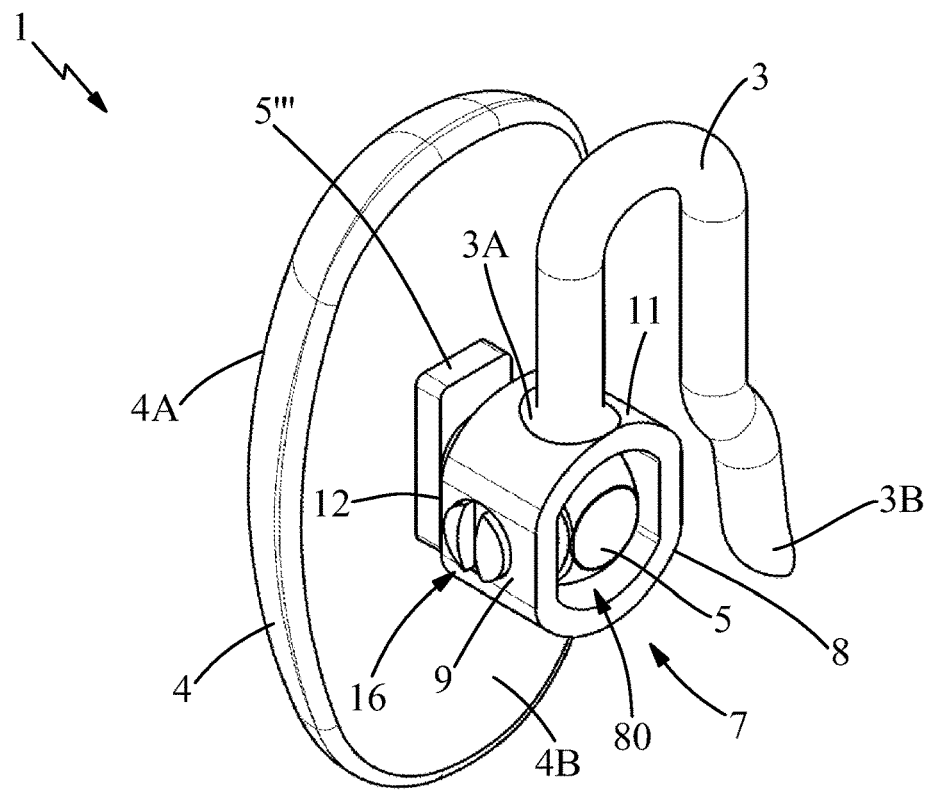
FIG. 3 shows a rear perspective view of the nosepiece according to the invention.
Figure 4:
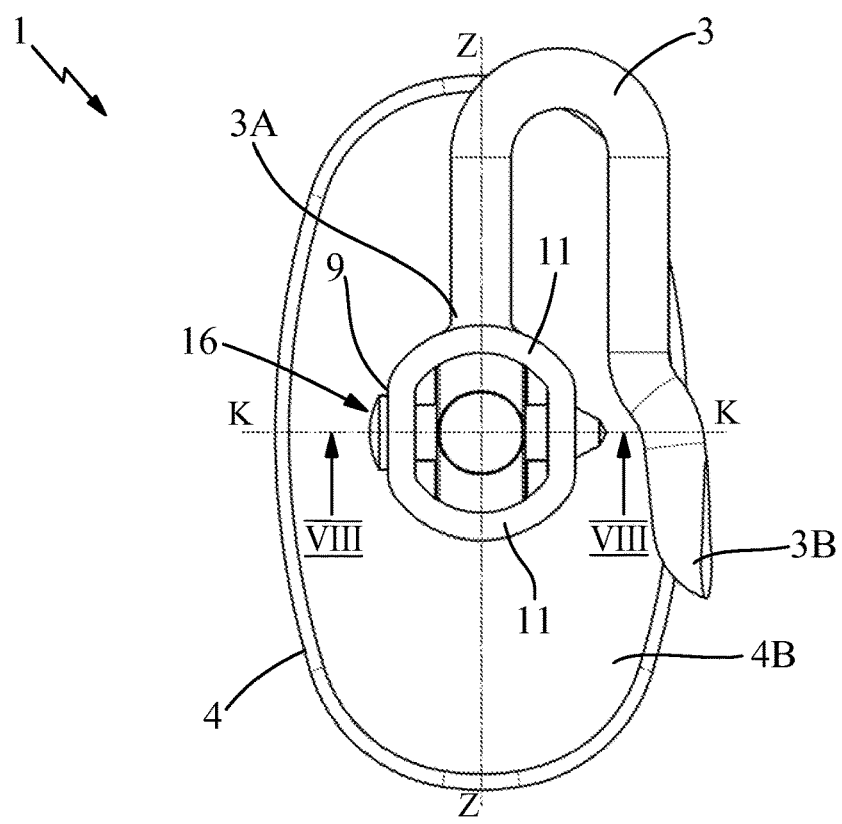
FIG. 4 shows an axonometric rear view of the nosepiece according to the invention.
Figure 5:
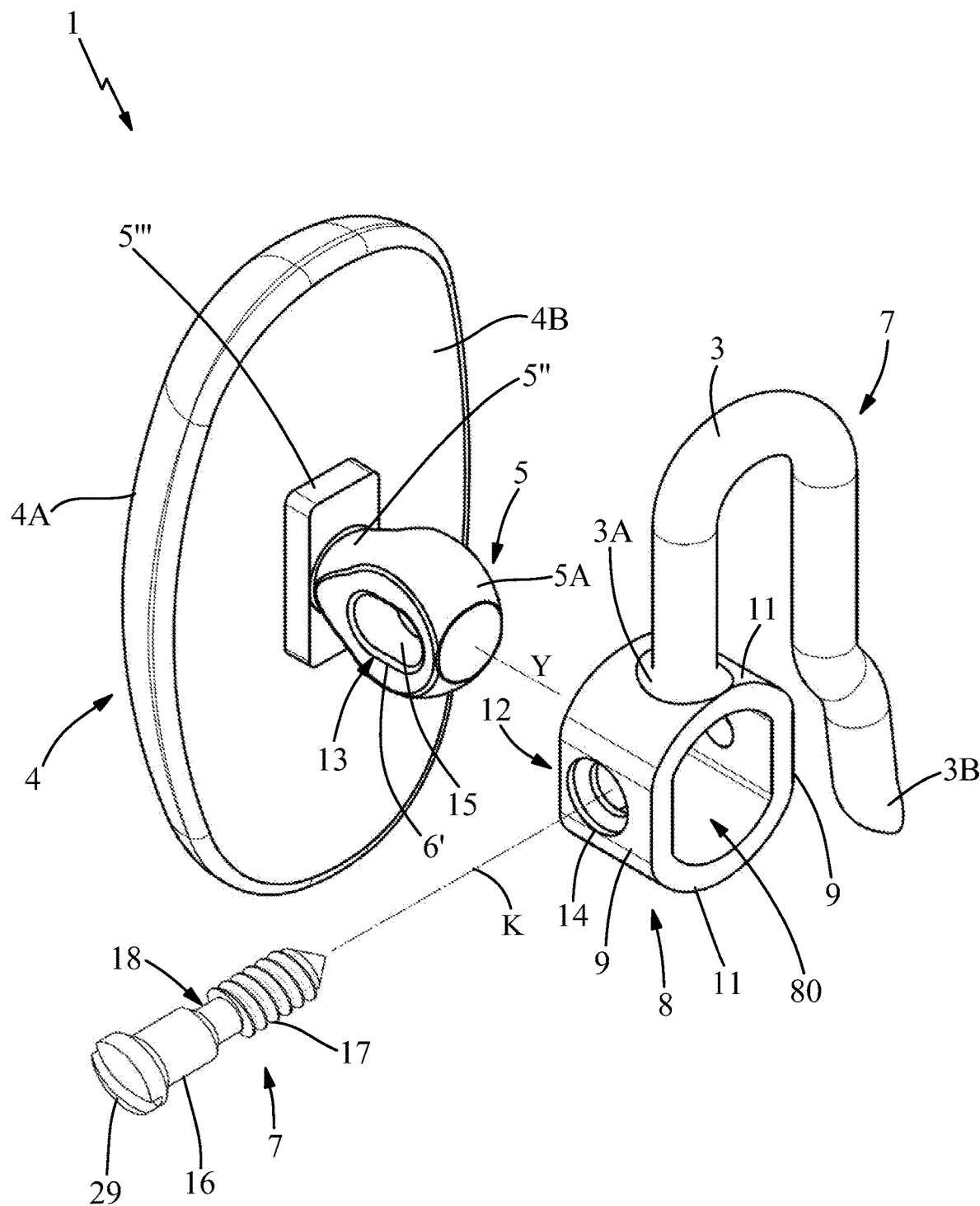
FIG. 5 shows a rear perspective view of the nosepiece according to the invention with its components illustrated in exploded view.
Figure 6:
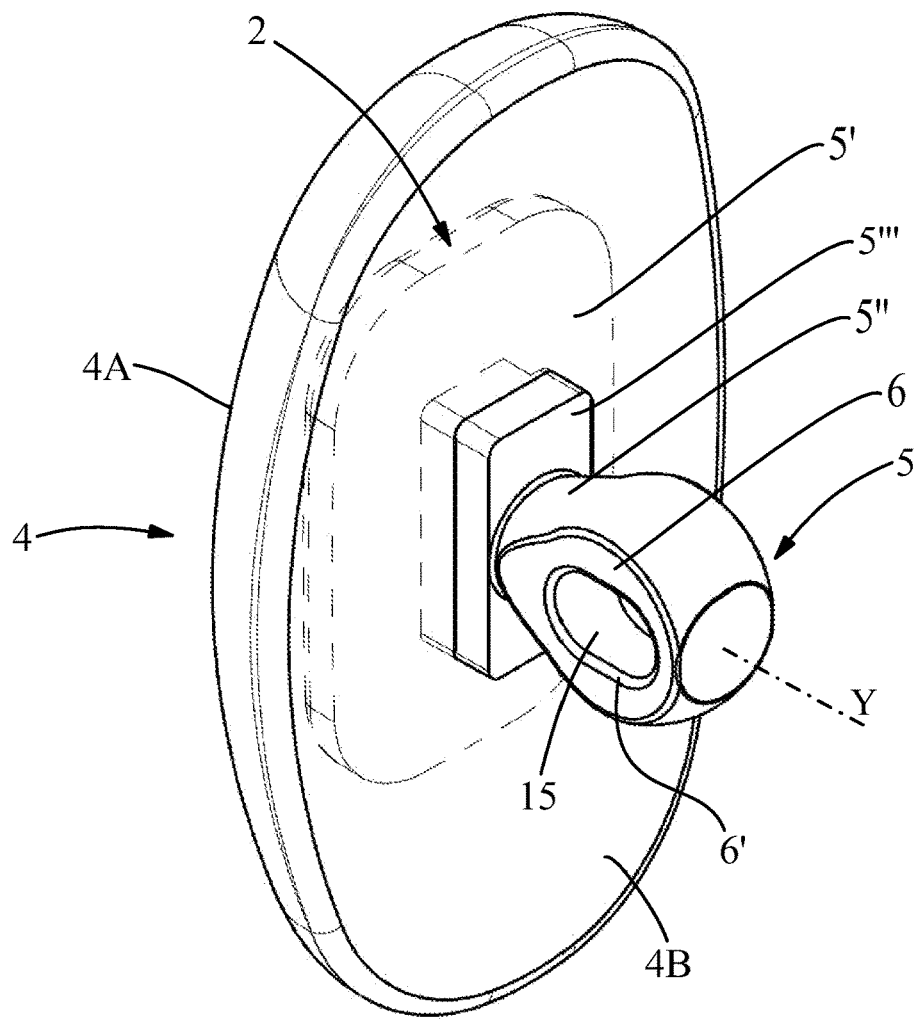
FIG. 6 shows an enlarged detail of the nosepiece according to the invention in a rear perspective view, relative to a support plate on the nose and to an insert fixed thereto.
Figure 7:
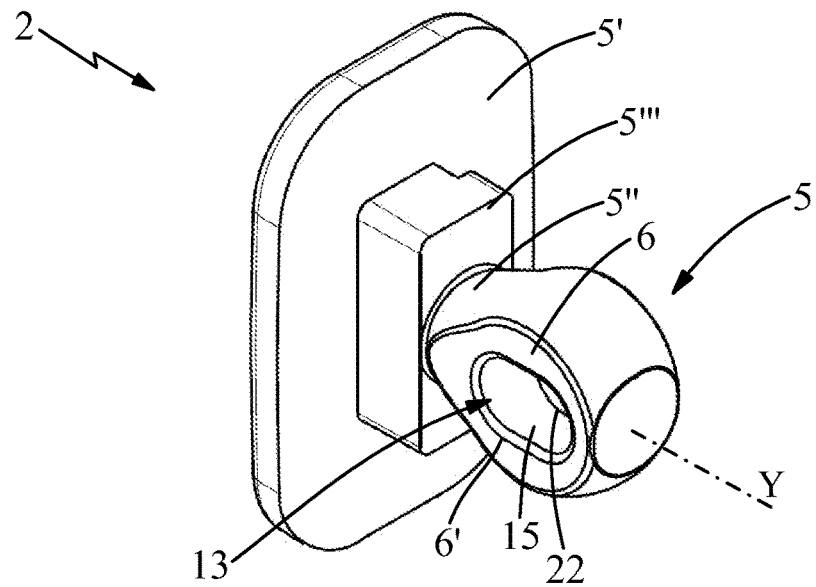
FIG. 7 shows an enlarged detail of FIG. 6 relative to the insert of the plate.

With reference to the enclosed drawings, reference number 1 overall indicates a nosepiece for eyeglass frames, subject of the present invention.

The nosepiece 1, according to the present invention, is intended to participate in the attainment of frames 20 for eyeglasses 10 of conventional as well as sports type, and is adapted to be abutted against the nose of a user in a per se known manner, in order to support the lenses correctly aligned with the eyes.

The frame 20 is not per se the subject of the present invention and therefore will be described only summarily hereinbelow, given that its structural principles are well-known to a man skilled in the art.

More in detail, the frame 20 is usually formed, in a per se entirely conventional manner, by a front 25, which supports a pair of lenses 26, connected in the central part by a bridge 27, and by a pair of temples 24 pivoted by means of hinges 28 placed on the sides of the front and, more precisely at two lateral portions thereof directed towards the rear part of eyeglasses and known in the technical jargon of the field with the term "end pieces".

The nosepiece 1 according to the invention can be fixed to a plastic frame 20 or to a metal frame 20, and in the preferred but non-limiting embodiment illustrated in the enclosed figures, the nosepiece 1 is advantageously employed with a metal frame 20.

The nosepiece 1 for eyeglass frames, subject of the present invention, comprises a plate 4 in a per se conventional manner provided with a front face 4A, intended to abut against the nose of a user, and with a rear face 4B.

Advantageously, the plate 4 has a substantially flattened shape, such that the two faces thereof are substantially parallel. The plate 4 is preferably made of a soft plastic material such as PVC or silicone and is intended to come into direct contact with the nose of the user by achieving a seal against the slipping of eyeglasses and simultaneously ensuring a high level of use comfort for the user.

The nosepiece 1 according to the invention also comprises an appendage 5, which is projectingly extended from the rear face 4B of the plate 4 along a main longitudinal axis Y and is provided with a first through hole 13 which is extended along a transverse axis K substantially orthogonal to the longitudinal axis Y and is delimited by an internal wall 15.

Preferably, the appendage 5 is made of harder plastic with respect to the plastic with which the plate 4 is advantageously made, such as polycarbonate or peek.

The longitudinal axis Y of the appendage 5 is advantageously orthogonal to the surface of the plate 4 itself.

The appendage 5 is projectingly extended from the rear face 4B of the plate 4 and preferably is part of an insert 2 which is provided with a support portion 5' advantageously embedded within the softer plastic material of the plate 4.

Preferably, the aforesaid appendage 5 is made integrally with the support portion 5'.

The support portion 5' is a substantially flat body, provided with a front surface substantially directed towards the front face of the plate 4, and decorations or logos can be made on such front surface, hence they can be visible through the plate 4 if this is made of transparent material.

The nosepiece 1 according to the invention also comprises mechanical retention elements 7 adapted to fix the appendage 5 to the frame 20 of eyeglasses 10.

The mechanical retention elements 7 comprise a cup 8 intended to be fixed to the frame 20 of eyeglasses 10, provided with at least two opposite lateral walls 9, joined together by at least one connector wall 11 and including two second through holes 14. The appendage 5 is at least partially housed between the lateral walls 9 with the first through hole 13 aligned with the second through holes 14 along the transverse axis K.

The mechanical retention elements 7 of the nosepiece 1, subject of the present invention, also comprise a screw 16 screwingly engaged in at least one of the second through holes 14 of the cup 8 and which has the stem 17 placed to traverse the first through hole 13 of the appendage 5 along the aforesaid transverse axis K.

Preferably, the mechanical retention elements 7 comprise a support arm 3, also termed "hook" in the technical jargon of the field, mechanically connected at a first end 3A thereof to a cup 8 (described in detail hereinbelow) and susceptible of being fixed at the second end 3B thereof to the frame 20 of eyeglasses 10.

The fixing of the support arm 3 to the frame 20 of eyeglasses 10 can be attained for example by means of welding to the bridge 27 or to circles (not provided in the embodiment illustrated in the enclosed figures) of the front 25 of the frame 20 adapted to support the lenses 26, if the latter is made of metal, or by embedding projecting portions provided at the second end 3B of the arm 3 in the plastic material matrix of the frame 20, if the latter is in fact made of plastic material.

Advantageously, the fixing of the support arm 3 on the frame 20 occurs along a longitudinal extension axis Z, substantially orthogonal to the transverse axis K and to the longitudinal axis Y.

The arm 3 is advantageously composed of a cylindrical metal wire, preferably provided with one or more folds for supporting the plate 4 on the nose starting from the frame 20.

Advantageously, the two lateral walls 9 of the cup 8 of the mechanical retention elements 7 are joined together at both ends by means of two connector walls 11 (with the nosepiece 1 mounted on the frame 20, one of these walls is substantially upper and one substantially lower) such to form a ring delimited by an internal containment chamber 80. Such chamber 80 can also be further closed with a bottom wall 11 placed to connect an edge of the two lateral walls 9 and an edge of the two connector walls 11 such to face an at least partially traversed mouth 12 of the appendage 5, which is housed within the chamber 80 itself.

The upper and lower connector walls 11 can have a flat progression, or advantageously they can have curved shape with concavity directed towards the interior of the containment chamber 80, which advantageously has cylindrical cap shape.

The two flat lateral walls 9 include two aforesaid second through holes 14, which are aligned with each other along the transverse axis K, which is advantageously substantially horizontal with the nosepiece 1 mounted on the frame 20 and being used by the user.

In accordance with the preferred embodiment illustrated in the enclosed figures, the appendage 5 of the nosepiece 1 comprises a convex portion 5A, which is delimited on two lateral flanks by at least two faces 6, preferably flat and parallel to each other.

The aforesaid faces 6 include first through hole 13, which is aligned with the second through holes 14 of the cup 8 along the transverse axis K.

Advantageously, in accordance with a preferred embodiment of the present invention illustrated in the enclosed figures, the convex portion 5A of the appendage 5 has spherical cap shape.

The convex portion 5A of the appendage 5 is also preferably connected to the support portion 5' through a neck 5", in particular with frustoconical shape, it too preferably leveled at the two lateral flanks by the continuations of the two aforesaid flat faces 6 of the convex portion 5A.

Advantageously, the insert 2 (the appendage 5 is advantageously part of this) also comprises a step-like base 5''' interposed between the support portion 5' and the neck 5", from which the convex portion 5A projects.

The appendage 5 advantageously has such size and is configured in order to be housed to size within the internal containment chamber 80 of the aforesaid cup 8, with its flat faces 6 arranged facing, and advantageously also parallel, to the lateral walls 9 of the cup 8.

The appendage 5, and hence also the plate 4 fixed thereto, is easily susceptible of being rotated within the internal containment chamber 80 of the cup 8 by rotating with respect to the latter around the transverse axis K with the surface of its convex portion 5A in contact and in sliding-with-friction relationship with the internal surface of at least one connector wall 11 (and advantageously with the two upper and lower connector surfaces) in order to maintain the plate 4 in the angular position attained around the transverse axis K once it has been released in such position.

According to the idea underlying the present invention, the screw 16 of the mechanical retention elements 7 is provided with an annular groove 18 made on the stem 17, delimited by a bottom wall 23.

In addition, the appendage 5 comprises at least one retention tooth 19 projecting from the internal wall 15 of the first through hole 13, at least partially housed within the annular groove 18 in order to retain the screw 16.

Advantageously, the annular groove 18 of the screw 16 is provided with a first width W1 parallel to the transverse axis K and the retention tooth 19 of the appendage 5 is provided with a second width W2 parallel to the transverse axis K and smaller than the first width W1 of the bottom wall 23 of the annular groove 18.

In this manner, the screw 16 is advantageously provided with mechanical clearance along the transverse axis K, between two end stops for the retention tooth 19 constituted by two annular shoulders 21 of the stem 17 of the screw 16 itself, and such annular shoulders 21 laterally delimit the annular groove 18.

In accordance with the preferred embodiment illustrated in the enclosed figures, the retention tooth 19 has substantially tapered shape starting from the internal wall 15 of the first through hole 13 of the appendage 5 up to an end edge thereof, advantageously being substantially shaped as a pyramid.

Preferably, moreover, the retention tooth 19 is made of plastic material and is deformed, preferably with the aforesaid end edge thereof, in abutment against the bottom wall 23 of the annular groove 18 in order to retain the screw.

In order to improve the retention of the screw 16, the appendage 5 comprises at least two retention teeth 19 arranged diametrically opposed on the internal wall 15 of the first through hole 13.

In accordance with a first embodiment of the appendage 5 of the nosepiece 1, subject of the present invention, illustrated in the enclosed FIG. 12, the two teeth 19 are arranged diametrically opposed with the respective end edges substantially facing and arranged along a substantially vertical direction with the nosepiece 1 mounted on the frame 20 of eyeglasses 10.

Otherwise, in accordance with a second embodiment of the appendage 5 of the nosepiece 1, subject of the present invention, illustrated in the enclosed FIG. 14, the two teeth 19 are arranged diametrically opposed with respective end edges substantially facing and arranged along a substantially horizontal direction with the nosepiece 1 mounted on the frame 20 of eyeglasses 10.

Otherwise, moreover, in accordance with a third embodiment of the appendage 5 of the nosepiece 1, subject of the present invention, illustrated in the enclosed FIG. 13, the appendage 5 itself comprises four retention teeth 19, provided projecting from the internal wall 15 of the first through hole 13, so as to further increase the retention of the screw 16, engaging the latter at four different points within the annular groove 18.

Advantageously, the two substantially parallel faces 6 of the appendage 5 are provided with two corresponding openings 6', advantageously aligned along the transverse axis K. The first through hole 13 is advantageously extended between the two openings 6' of the faces 6 and is tapered starting from the faces 6 themselves towards the interior up to a substantially median narrowing 22 thereof, in particular median with respect to the extension of the first through hole 13 along the transverse axis K, and preferably of substantially circular shape.

The screw 16 of the mechanical retention elements 7 is provided (in a manner per se well-known to the man skilled in the art) with a head 29 and with the aforesaid stem 17 projectingly fixed to the head 29 itself. The screw 16 is engaged in at least one of the second through holes 14 of the cup 8 by means of a coupling via screwing and has the stem 17 which traverses the first through hole 13 made in the appendage 5.

The stem 17 of the screw 16 has diameter smaller than or equal to that of the transverse extension of the first through hole 13 and advantageously the stem 17 has diameter smaller than or equal to the substantially median narrowing 22 of the first through hole 13.

In accordance with the preferred embodiment illustrated in the enclosed figures, the annular groove 18 is made in a substantially median position with respect to the main extension of the stem 17, i.e. in other words in a substantially median position with respect to the extension of the stem 7 along the transverse axis K.

In this manner, providing that the assembly formed by the appendage 5 and by the faces 6 of the cup 8 are mirrored with respect to a plane passing through the median narrowing 22, the annular groove 18 is advantageously aligned with the at least one retention tooth 19, for an optimal retention of the screw 16.

The appendage 5, and hence also the plate 4 fixed thereto, is susceptible of being rotated with respect to the cup 8, around the longitudinal extension axis Z with the surface of its convex portion 5A in contact and in sliding-with-friction relationship with the internal surface of the connector wall 11, in order to maintain the plate 4 in the angular position attained around the longitudinal extension axis Z once it has been released in such position.

In accordance with a particular embodiment of the invention, the bottom wall 23 of the annular groove 18 made on the stem 17 of the screw 16 is in contact with the internal wall 15 of the first through hole 13 at the substantially middle narrowing 22 thereof and in particular such bottom wall 23 has size such to be in contact with the end edge of the at least one tooth 19 of the appendage 5.

Advantageously, the at least one retention tooth 19 is made at the narrowing 22 of the first through hole 13.

In operation, during the rotation of the appendage 5, and hence also of the plate 4 fixed thereto, with respect to the cup 8 around the longitudinal extension axis Z, the internal wall 15 of the first through hole 13 is in contact and in sliding-with-friction relationship with the surface of the stem 17 of the screw 16, at least at the at least one retention tooth 19 provided at the narrowing 22, in order to assist in maintaining the plate 4 in the angular position attained around the longitudinal extension axis Z.

In this manner, each time that the eyeglasses 10 are taken off, the nosepieces 1 remain in their correct orientation defined by the shape of the nose of the user, for position adjustments which involved a rotation around the transverse axis K as well as for position adjustments which involved a rotation around the longitudinal extension axis Z, and for position adjustments which involved, as is more common, a combination of both the aforesaid rotations.

In addition, the retention teeth 19 prevent the screw 16 of the mechanical retention elements 7 from being moved, and in the most extreme situation from being released, along a direction substantially parallel to the transverse axis K with respect to the first through hole 13 and/or with respect to the second through holes 14.

Figure 8:
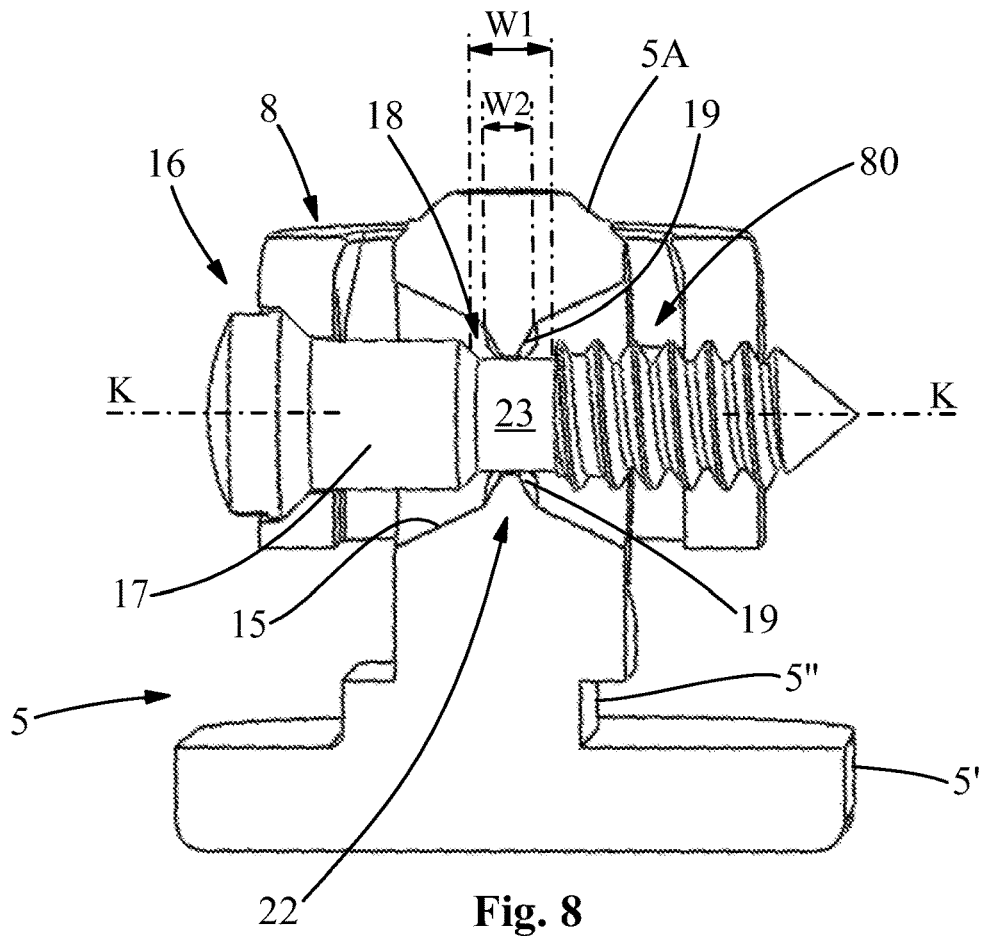
FIG. 8 shows a longitudinal section view of the nosepiece of FIG. 4 made along the trace VIII-VIII of the same FIG. 4.
Figure 9:
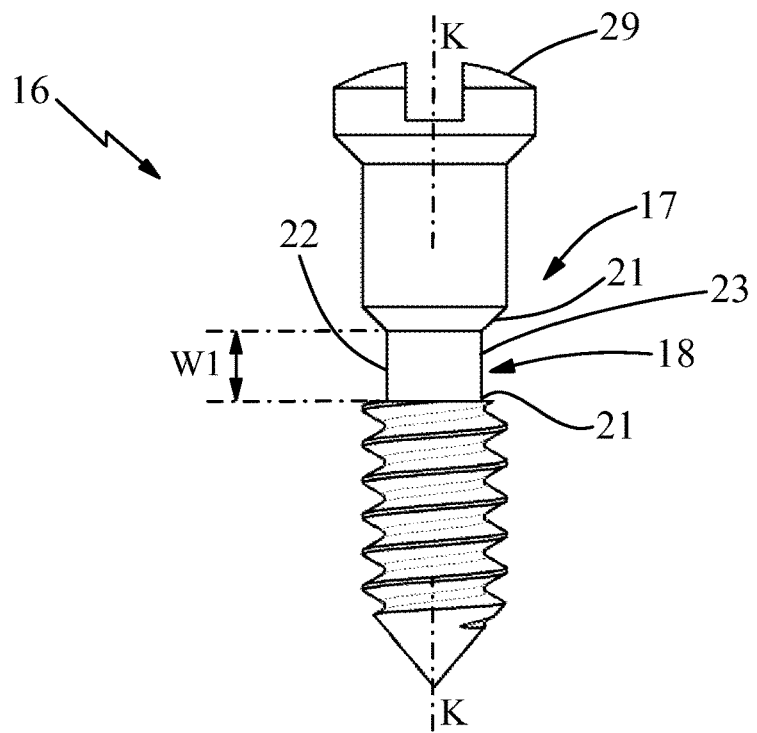
FIG. 9 shows an enlarged detail of the nosepiece according to the invention in a rear perspective view, relative to a screw of retention elements of the plate in a first embodiment thereof.

In accordance with a first embodiment of the annular groove 18 of the screw 16 of the mechanical retention elements 7 illustrated in the enclosed FIGS. 8 and 9, the bottom wall 23 of the annular groove 18 itself defines a surface of contact with the at least one retention tooth 19 of substantially cylindrical shape.

Figure 15:
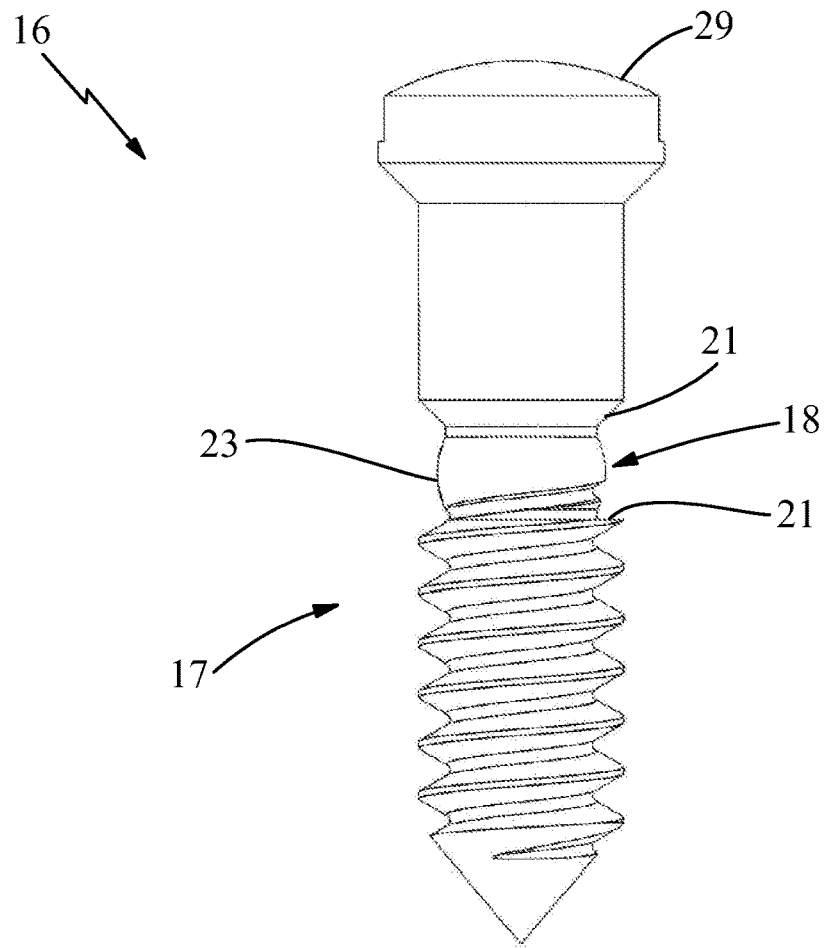
FIG. 15 shows an enlarged detail of the nosepiece according to the invention in a rear perspective view, relative to a screw of the retention elements of the plate in a second embodiment thereof.
Figure 16:
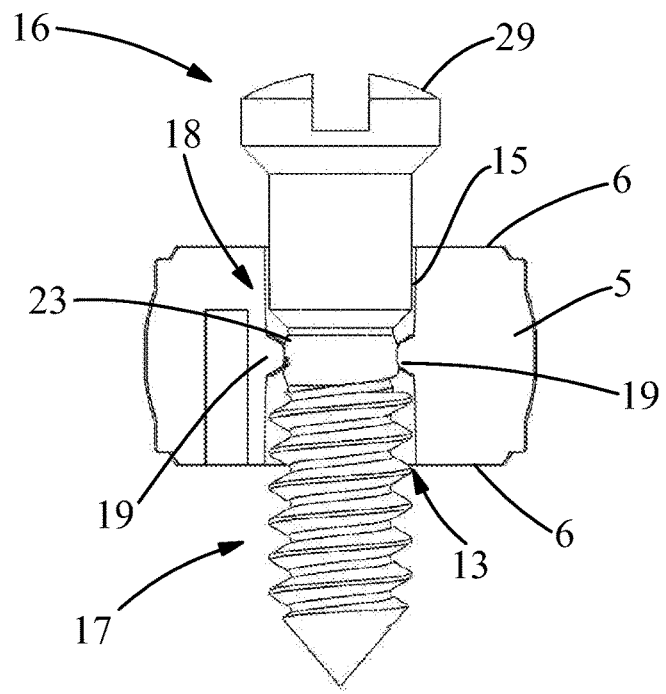
FIG. 16 shows a top sectional view of the nosepiece according to the invention, with the screw of the retention elements in the second embodiment thereof.

In accordance with a second embodiment of the annular groove 18 of the screw 16 of the mechanical retention elements 7 illustrated in the enclosed FIGS. 15 and 16, the bottom wall 23 of the annular groove 18 defines a surface of contact with the at least one retention tooth 19 of substantially spherical segment shape.

The spherical segment shape of the second embodiment of the bottom wall 23 of the annular groove 18 simulates a ball joint coupling between the appendage 5 and the screw 16.

In operation, so as to rotate the plate 4 of the nosepiece 1 around the transverse axis K and/or around the longitudinal extension axis Z, the end edge of the at least one retention tooth 19 slides with friction coupling on the substantially spherical surface of the bottom wall 23 of the annular groove 18.

The annular groove 18 of the screw 16 is advantageously laterally limited by the aforesaid two annular shoulders 21, which delimit the movement of the at least one retention tooth 19 during the rotation of the plate 4 in order to position the nosepiece 1 on the nose of the user.

More in detail, the two annular shoulders 21 are extended around the transverse axis K, delimiting the extension of the bottom wall 23 along the transverse axis K itself.

Advantageously, the stem 17 of the screw 16 comprises a thread arranged between the annular groove 18 and the tip of the screw 16 itself, in a manner such that the annular groove 18 is arranged between the thread of the screw 16 and the head 29 of the latter.

Preferably, the external diameter of the threaded portion of the screw 16 is greater than the diameter of the bottom wall 23 of the annular groove 18 and, in particular, is greater than the diameter of the narrowing 22 of the first through hole 13 of the appendage 5. Suitably, such threaded portion, at one end thereof, defines one of the aforesaid shoulders 21 which limit the annular groove 18.

In operation, initially the convex portion 5A of the appendage 5 is inserted between the lateral walls 9 of the cup 8, aligning the first through hole 13 with the second through holes 14 along the transverse axis K.

In order to insert the screw 16 of the mechanical retention elements 7 within the first through hole 13 and the second through holes 14, the stem 17 of the screw 16 is initially inserted within one of the two second through holes 14, which is advantageously provided with width greater than the other second through hole 14, so as to allow the stem 17 of the screw 16 to pass without interfering.

Once the other second through hole 14 is reached, by traversing the internal wall 15 of the first through hole 13, the stem 17 of the screw 16 (advantageously threaded) is engaged with such hole 14 by means of a coupling of screw-nut screw type.

The screw 16 is therefore screwed (by means of a tool well-known to the man skilled in the art, such as an automatic screwdriver) until the head 29 abuts against the lateral wall 9 that delimits the corresponding second through hole 14.

Figure 10:
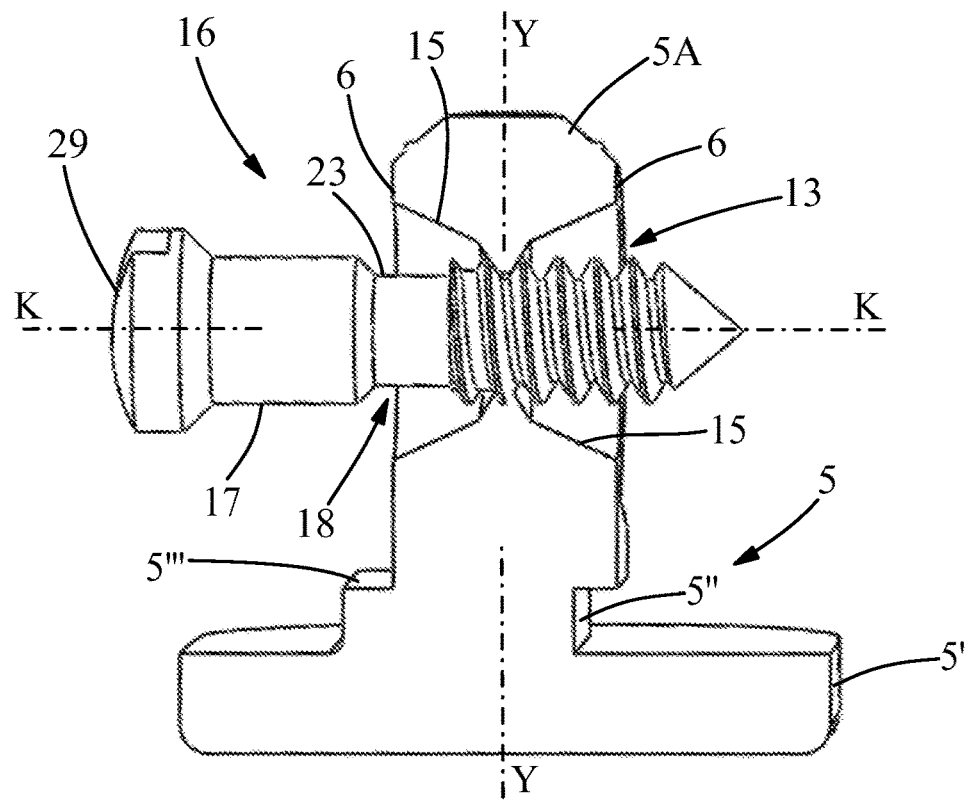
FIG. 10 shows a longitudinal section view of the nosepiece of FIG. 4 during the insertion of the screw of the retention elements, made along the trace VIII-VIII of the same FIG. 4.
Figure 11:
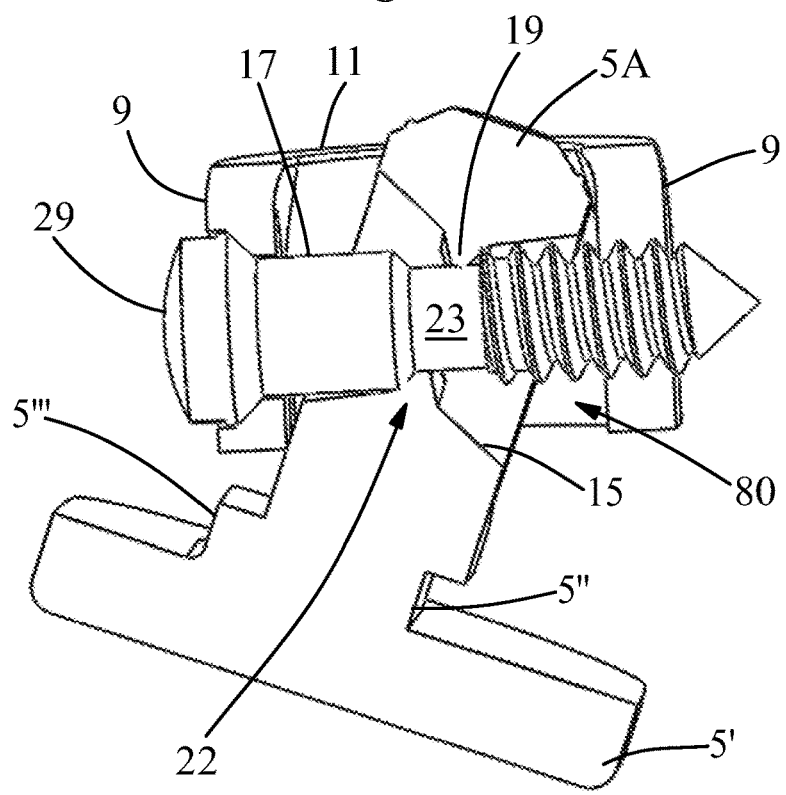
FIG. 11 shows a longitudinal section view of the nosepiece of FIG. 4 in a rotated position of the plate, made along the trace VIII-VIII of the same FIG. 4.

During the insertion of the screw 16 through the first through hole 13, the thread of the stem 17 acts on the at least one retention tooth 19, at least partially deforming it, in accordance with that illustrated in the enclosed FIG. 10. Suitably, the thread of the stem 17 of the screw 16 is adapted to be engaged via screwing with the at least one retention tooth 19, which is adapted to be inserted in the helical groove of the thread, in a manner such that, by screwingly acting on the screw 16, the stem 17 of the latter can advance along the first through hole 13.

With the head 29 in abutment against the lateral wall 9, the annular groove 18 is aligned with the narrowing 22 of the internal wall 15 of the first through hole 13, and therefore the at least one retention tooth 19 is at least partially housed within the annular groove 18 itself, blocking the screw 16 with respect to accidental movements thereof along the transverse axis K.

Hereinbelow, a method is described for mounting a nosepiece for eyeglass frames, of the type described herein and regarding which the same reference numbers will be maintained for the sake of description simplicity.

The method for mounting the nosepiece 1, subject of the present invention, comprises a step of housing the appendage 5 within the cup 8 of the mechanical retention elements 7 until the first through hole 13 is substantially aligned with the second through holes 14 along the transverse axis K.

The mounting method also comprises a step of inserting the screw 16 of the mechanical retention elements 7 within the second through holes 14 and within the first through hole 13 until the stem of the screw 16 is screwingly engaged in at least one of the second through holes 14 of the cup 8.

According to the idea underlying the present invention, the step of inserting the screw 16 also provides for connecting the retention tooth 19 of the appendage 5 within the annular groove 18 made on the stem 17 of the screw 16.

Advantageously, the mounting method provides for a step of rotation in which the plate 4 of the nosepiece 1 is rotated around the transverse axis K and/or around the longitudinal extension axis Z in order to make the plate 4 itself reach the desired position on the nose of the user.

More in detail, during the rotation step, the end edge of the at least one retention tooth 19 slides with friction coupling on the surface of the bottom wall 23 of the annular groove 18.

The invention thus conceived therefore attains the pre-established objects.

The invention claimed is:

1. A nosepiece for eyeglass frames, which comprises:
   a plate provided with a front face, intended to abut against the nose of a user, and with a rear face;
   an appendage, which is projectingly extended from the rear face of said plate along a longitudinal axis and is provided with a first through hole which is extended along a transverse axis substantially orthogonal to said longitudinal axis and is delimited by an internal wall; and
   mechanical retention elements adapted to fix said appendage to the frame of eyeglasses;
   where said mechanical retention elements comprise at least:
      one cup intended to be fixed to the frame of eyeglasses, provided with at least two opposite lateral walls, which are joined together by at least one connector wall and include two second through holes; said appendage being at least partially housed between said lateral walls with said first through hole aligned with said second through holes along said transverse axis, and
      a screw screwingly engaged in at least one of the second through holes of said cup and having a stem placed to traverse said first through hole of said appendage along said transverse axis;

wherein said screw is provided with an annular groove made on said stem and delimited by a bottom wall;

wherein said appendage comprises at least one retention tooth projecting from the internal wall of said first through hole, and at least partially housed within said annular groove in order to retain said screw;

wherein said annular groove of said screw is provided with a first width parallel to said transverse axis and that said retention tooth of said appendage is provided with a second width parallel to said transverse axis and smaller than said first width of the bottom wall of said annular groove.

2. The nosepiece for eyeglass frames according to claim 1, wherein said retention tooth is made of plastic material and is deformed against the bottom wall of said annular groove in order to retain said screw.

3. The nosepiece for eyeglass frames according to claim 1, wherein said appendage comprises at least two retention teeth arranged diametrically opposed on the internal wall of said first through hole.

4. Nosepiece for eyeglass frames according to claim 1, wherein said appendage is provided with two faces that are substantially parallel and provided with two corresponding openings; said first through hole extended between said two openings of said faces and being tapered starting from said faces towards the interior up to a substantially median narrowing.

5. The nosepiece for eyeglass frames according to claim 4, wherein said at least one retention tooth is made at said narrowing of said first through hole.

6. The nosepiece for eyeglass frames according to claim 4, wherein said appendage is susceptible of rotating with respect to said cup around a longitudinal extension axis substantially orthogonal to said transverse axis and to said longitudinal axis, with the surface of said at least one retention tooth made on said narrowing at least partially in contact and in sliding-with-friction relationship with the surface of the stem of said screw in order to collaborate to maintain said plate in angular position attained around said longitudinal extension axis.

7. The nosepiece for eyeglass frames according to claim 5, wherein said appendage is at least partially housed within said cup with said faces facing the lateral walls of said cup, and is susceptible of rotating with respect to said cup around said transverse axis.

8. The nosepiece for eyeglass frames according to claim 1, wherein said bottom wall of said annular groove defines a surface of contact with said at least one retention tooth of substantially cylindrical shape.

9. The nosepiece for eyeglass frames according to claim 1, wherein the bottom wall of said annular groove defines a surface of contact with said at least one retention tooth of substantially spherical segment shape.

10. A nosepiece for eyeglass frames, which comprises:
a plate provided with a front face, intended to abut against the nose of a user, and with a rear face;
an appendage, which is projectingly extended from the rear face of said plate along a longitudinal axis and is provided with a first through hole which is extended along a transverse axis substantially orthogonal to said longitudinal axis and is delimited by an internal wall; and
mechanical retention elements adapted to fix said appendage to the frame of eyeglasses;
where said mechanical retention elements comprise at least:
one cup intended to be fixed to the frame of eyeglasses, provided with at least two opposite lateral walls, which are joined together by at least one connector wall and include two second through holes; said appendage being at least partially housed between said lateral walls with said first through hole aligned with said second through holes along said transverse axis, and
a screw screwingly engaged in at least one of the second through holes of said cup and having a stem placed to traverse said first through hole of said appendage along said transverse axis;
wherein said screw is provided with an annular groove made on said stem and delimited by a bottom wall;
wherein said appendage comprises at least one retention tooth projecting from the internal wall of said first through hole, and at least partially housed within said annular groove in order to retain said screw;
wherein said appendage is provided with two faces that are substantially parallel and provided with two corresponding openings; said first through hole extended between said two openings of said faces and being tapered starting from said faces towards the interior up to a substantially median narrowing.

* * * * *